(No Model.)
G. P. ROSE.
NUT LOCK.
No. 332,288. Patented Dec. 15, 1885.
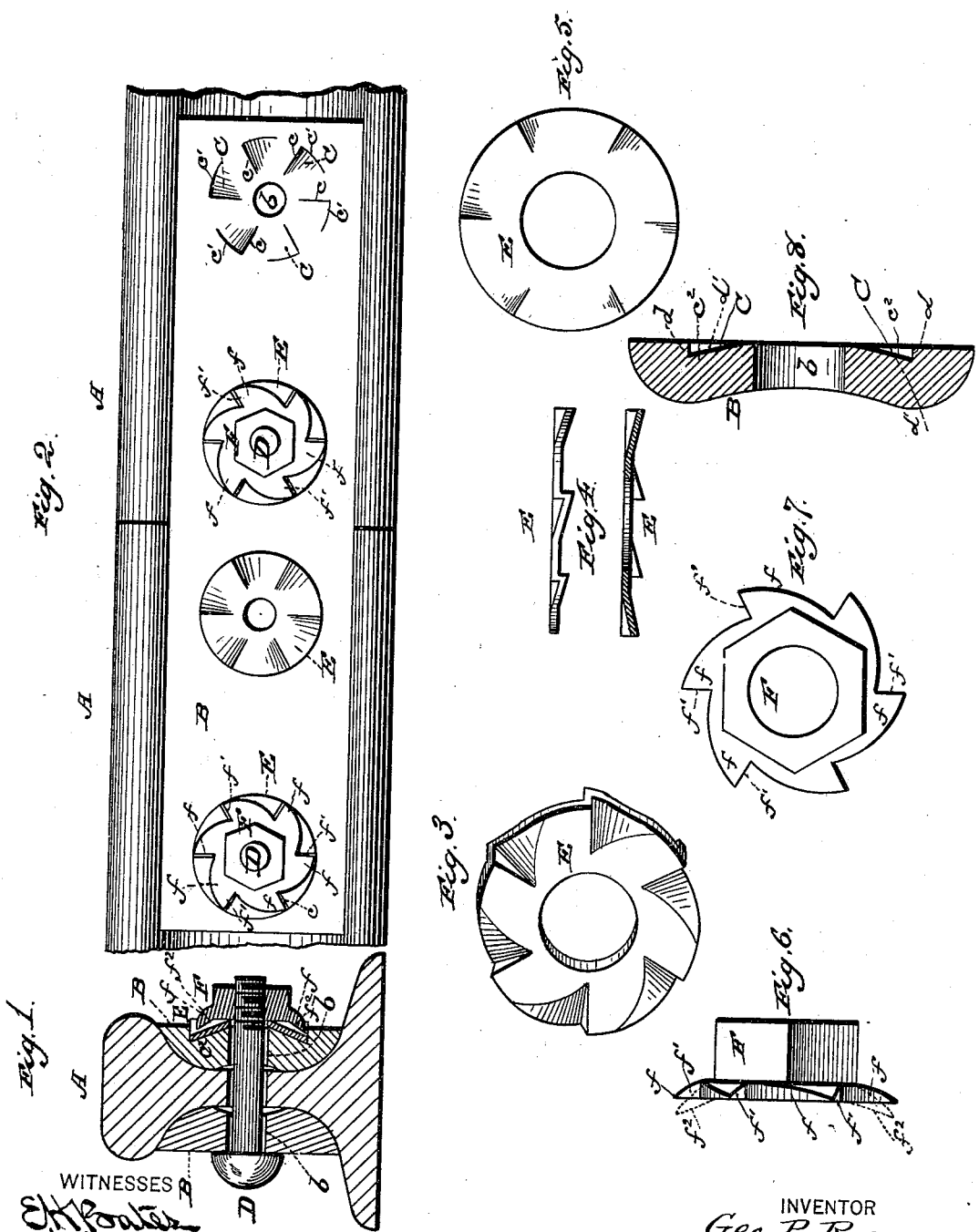
WITNESSES
INVENTOR
Geo. P. Rose,
by Anderson & Smith
his ATTORNEYS

UNITED STATES PATENT OFFICE.

GEORGE P. ROSE, OF FENTONVILLE, MICHIGAN.

NUT-LOCK.

SPECIFICATION forming part of Letters Patent No. 332,288, dated December 15, 1885.

Application filed March 7, 1885. Serial No. 158,065. (No model.)

*To all whom it may concern:*

Be it known that I, GEORGE P. ROSE, a citizen of the United States, residing at Fentonville, in the county of Genesee and State of Michigan, have invented certain new and useful Improvements in Nut-Locks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a vertical cross-section of my device. Fig. 2 is a side view of the same. Figs. 3, 4, 5, 6, 7, and 8 are detail views.

This invention has relation to improvements in nut-locks; and it consists in the construction, novel arrangement, and adaptation of devices, as will be hereinafter more fully set forth, and particularly pointed out in the appended claim.

Reference being had to the accompanying drawings, and to the letters of reference marked thereon, A A represent the meeting ends of two rails, and B B represent opposite and similar fish-plates placed thereon.

$b$ $b$ are bolt-openings in the fish-plates, having formed around them any desired number of similar depressions, C C. Each depression C, beginning on the surface of the fish-plate, increases in depth outward, and is composed of the straight radial side $c$, the outer side, $c'$, made on the arc of a circle concentric with the bolt-opening, and the inclined floor $c^2$, the deepest part of the depression being the meeting-point of the sides $d$ and $d'$. The depressions thus resemble ratchet-teeth reversed.

D D are the bolts passing through the openings $b$ and through the webs of the intervening rails in the usual manner.

E E are similar metallic washers, provided with circular openings to pass over the bolts, and stamped or corrugated into proper shape to fit snugly in the depressions C.

F F are the nuts, each of which has formed around its inner edge the ratchet-teeth $f$, corresponding in number to the depressions in the fish-plate or the corrugations in the washer. Each tooth $f$ has the straight edge $f'$ and the inclined edge $f^2$, and diminishes regularly in thickness from base to point. The straight edge $f'$ corresponds to the straight side of a depression, C, or corresponding corrugation in the washer, and the inclined edge $f^2$ corresponds to the inclined side of the same. When the rails are brought together, the fish-plates placed thereon, and the bolts passed through their proper openings, the washers are put in place, and the nuts screwed tightly down until each tooth of the latter is over a corrugation in the washers. The points of the teeth are then depressed, by a hammer blow or otherwise, into the said corrugations. To unscrew the nut, the teeth must be bent up out of the corrugations.

Having described my invention, what I desire to secure by Letters Patent is—

The combination of the fish-plate, provided around its bolt-apertures with a series of depressions having an inclined base-wall and a straight lateral wall, as set forth, the nut B, having around its inner edge a series of ratchet-teeth decreasing in thickness from base to point, and the metallic washer having one side provided with corrugations to enter the depressions of the fish-plate and its opposite side provided with perforations to receive the teeth of the nut, the whole adapted to serve in connection with railway-rails, substantially as specified.

In testimony whereof I affix my signature in presence of two witnesses.

GEORGE P. ROSE.

Witnesses:
CHAS. B. WILMOT,
GEO. W. WILMOT.